Sept. 10, 1935.  C. M. MURPHY  2,013,733
WINDING REEL FOR CABLES
Filed Nov. 6, 1934
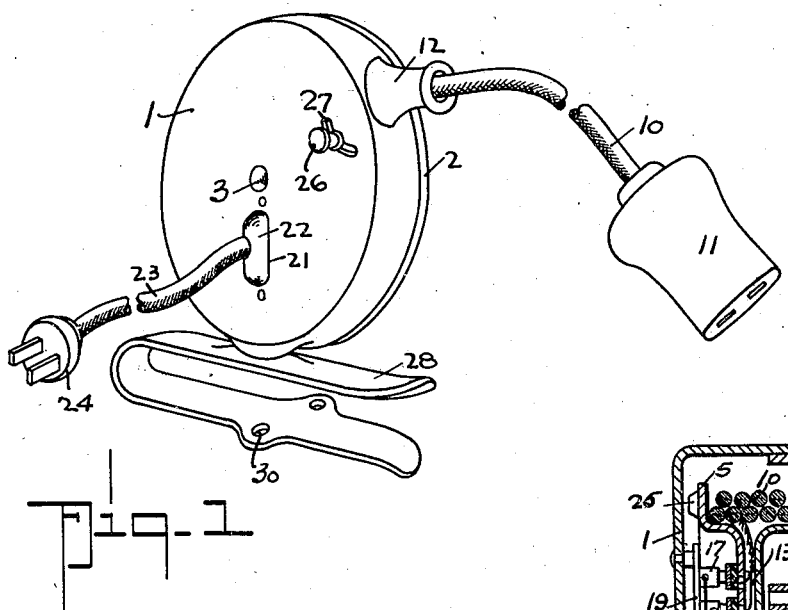
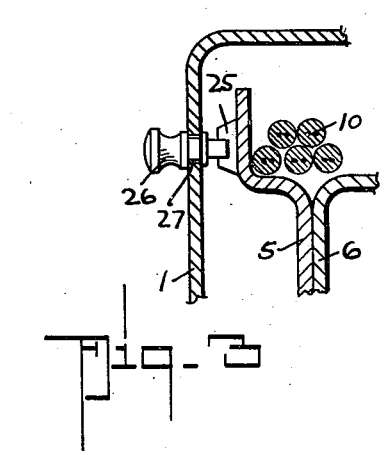
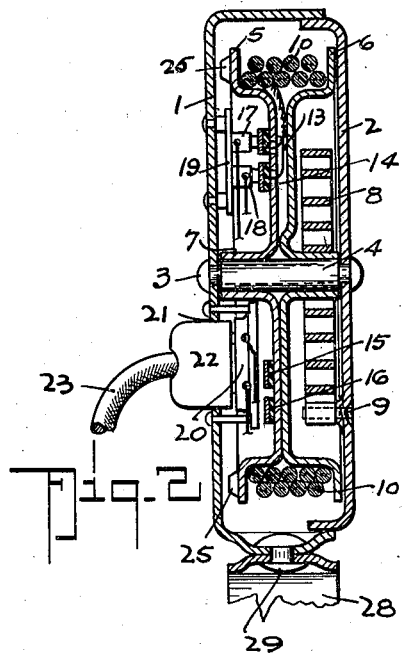
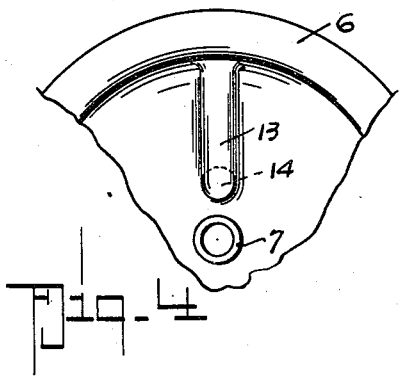
Claude M. Murphy
*Inventor*
By *Herbert E. Smith*
*Attorney*

Patented Sept. 10, 1935

2,013,733

UNITED STATES PATENT OFFICE 2,013,733

WINDING REEL FOR CABLES

Claude M. Murphy, Ione, Wash.

Application November 6, 1934, Serial No. 751,725

1 Claim. (Cl. 173—367)

The present invention relates to an improved winding reel for cables of the automatic, spring-winding type, and adapted especially to take up slack in telephone cords, cords or cables for electric light fixtures, electric heated irons, and other similar electrical appliances that are customarily "plugged-in" to the wires or wiring system of a home.

The winding reel device may be interposed as an electrical appliance or device which forms an electrical connection and extension for usual house wiring systems whereby the usual electric cord may be "plugged-in" at one of its ends to the usual outlet in a wall and also connected at its other end to the winding reel, from which reel the extension may be withdrawn as desired, for use. Means are provided for setting the winding reel, for the purpose of limiting the winding and unwinding of the cable, and means are provided for detachably fastening the device to a suitable support where the connection on the end of the wound cable or cord is readily accessible for use.

The invention consists in certain novel combinations and arrangements of parts as will hereinafter be more fully set forth and claimed. In the accompanying drawing I have illustrated one complete example of the physical embodiment of my invention wherein the parts are combined and arranged according to the best mode I have thus far devised for the practice of the principles of my invention, but it will be understood that changes and alterations may be made within the scope of my claim, without departing from the principles of my invention.

Figure 1 is a perspective view of a winding reel embodying my invention showing the device ready to be "plugged-in" to a wall-outlet and also showing the connection from the reel to an electrical appliance.

Figure 2 is a transverse sectional view of the device.

Figure 3 is an enlarged detail sectional view showing one of the stops, and a set screw for limiting rotary movement of the reel.

Figure 4 is a detail plan view of a portion of the reel showing the radial duct in the reel for the ends of the cable or cord wound on the reel.

In carrying out my invention I employ a sectional, flat, cylindrical casing made up of the two flanged sections 1 and 2 that are held together by means of the central rivet or bolt 3, on which bolt a spacing sleeve 4 is mounted for the purpose of spacing the sections of the casing, and to form a journal bearing for the reel.

The reel is also of sectional construction, being made up of two flanged disks 5 and 6 stamped out of suitable metal, and the disks are fashioned with alined bosses that form a central hub 7 to revolve on the bearing sleeve 4.

The reel is turned on its bearing sleeve by means of a helical spring 8 that is coiled about the hub, at one side of the reel, with its outer end attached at 9 to the inner face of the section 2 of the casing. The reel may thus be wound or turned on the bearing sleeve in one direction to wind up, or place under tension, the coiled spring 8, and then the tension of the spring is utilized to turn the reel in opposite direction, as usual.

On the periphery of the flanged reel the electric cord or cable 10 is wound, and this cord, which at its outer end is provided with an electrical connector 11, passes through an exterior guide 12, in the form of an exterior collar fixed in the open peripheral wall of the reel-casing, and projecting therefrom at a point approximately tangential to the periphery of the reel within the casing.

The cord or cable is wound in coils on the reel, the number of coils depending on the length of cord or cable, and the inner ends of the wires forming the cable are passed down or inwardly, through a radial duct or groove 13 of the reel, located between the sections 5 and 6. Openings 14 in the reel are provided for the wires to pass through to the exterior of the reel, and these wires are attached to the two annular insulated, conductors, or rings 15 and 16, arranged concentrically on the face or side of the reel, as indicated in Figure 2, and these rings or conductors of course, revolve or turn with the reel.

Each conductor ring has a brush, as 17 and 18 in frictional and electrical contact therewith, and the brushes are supported on the fixed insulating bar 19 that is attached at the inner side of the section 1 of the casing.

At another point on the inner face of the section 1 of the casing, i. e. within the casing, I provide a terminal connection at 20 comprising the usual insulated bracket and prongs or conductor-pins, and the latter are positioned in a slot 21 arranged in the wall of the casing for the accommodation of the connection 22 which is fashioned with the usual sockets that slip over the prongs or pins of the fixed connection 20 to make electrical connection from the wires 23, or usual cord, leading to the connection plug 24. The plug 24 may be "plugged-in" to a usual wall socket or outlet and when the connection 22 is attached to the reel the electrical connection then passes through the electrically connected parts of the device, cable or cord 10, and the connection 11, to a switch or other connection to an electrically heated iron, or other household appliance.

Through the connection 11, the cord or cable 10 may gently and smoothly withdraw from the reel, or the slack in the cord or cable may be taken up by the automatic winding of the spring reel. Thus the cord or cable may be alternately unwound and wound, as the electric iron is moved back and forth over the ironing board, and the cord or cable is thus prevented from gathering in tangles or coils that would impede the progress of the ironing operations.

If desired, a predetermined length of the cord may be withdrawn from the reel, and then the reel may be allowed a certain amount of "play" without further unwinding or winding of the cord. For this purpose one of the reel sections, as 5, on its flanged periphery, is provided with one or more spaced lugs 25, and the casing is provided with an abutment pin 26 that is adjustable and secured in the arcuate slot 27 of the casing wall and may be disposed in the circular path of movement of the lug or lugs 25 of the reel. In this manner the rotation of the reel may be limited to arc of the length corresponding to the distance between two lugs 25, or when only one lug is used a predetermined portion of the free end of the cord 10 may be prevented from being wound on the reel.

By means of a spring clip 28 the reel device may be detachably fastened to a suitable support, as for instance the edge of a table, or the edge of an ironing board. The U-shaped clip 28 which is fashioned of resilient or spring metal is pivoted as at 29 to the reel casing, the pivot pin being located at the approximate center of the clip and extending perpendicular to the axis of the revolving reel, so that the reel device may oscillate on the pin 29, freely, while the iron is being moved back and forth and dragging the cord or cable 10 with it.

At 30, 30 two perforated ears are fashioned on the clip and by this means the reel device, through the clip, may be mounted on a suitable flat support, as the base board or floor board extending around a house-wall at the floor line. The spring, or resiliency, of the clip, under these conditions, will act to absorb or take up any excessive jerks that may accidentally be applied to the cord 10 and which cannot be taken care of by the spring-wound reel.

Having thus fully described my invention, what I claim as new and desire to secure by Letters Patent is:—

The combination with a flat cylindrical casing having a journal bearing therein, of a reel comprising a pair of flat disks each having annular flanges and forming a peripheral groove and one of said disks having an interior, radial groove, said reel journaled on the bearing, a pair of concentric conductor rings on one side of the reel within a space formed by the flanged reel and casing, a pair of brushes within the casing for making electrical contact with said rings, a stationary terminal connection in electrical contact with said brushes and mounted on the casing and adapted to receive a detachable connection and electric cord, a coiled spring mounted at the other side of the reel in a space formed between the reel and casing, said spring having its ends attached respectively to the casing and reel, an electric cord or cable wound in said peripheral groove and having its inner end passing through said radial groove terminating at the conductor rings and in electrical contact therewith.

CLAUDE M. MURPHY.